United States Patent
Yerrapragada et al.

(10) Patent No.: US 12,554,592 B2
(45) Date of Patent: Feb. 17, 2026

(54) INTEGRATION OF DATABASE WITH DISTRIBUTED STORAGE SYSTEM

(71) Applicant: Rubrik, Inc., Palo Alto, CA (US)

(72) Inventors: Jayesh Bhaskar Yerrapragada, Karnataka (IN); Anuj Dhawan, Punjab (IN); Rajat Paliwal, Rajastan (IN)

(73) Assignee: Rubrik, Inc., Palo Alto, CA (US)

( * ) Notice: Subject to any disclaimer, the term of this patent is extended or adjusted under 35 U.S.C. 154(b) by 279 days.

(21) Appl. No.: 18/510,388

(22) Filed: Nov. 15, 2023

(65) Prior Publication Data

US 2024/0086286 A1  Mar. 14, 2024

Related U.S. Application Data

(63) Continuation of application No. 17/586,689, filed on Jan. 27, 2022, now Pat. No. 11,971,787.

(30) Foreign Application Priority Data

Nov. 11, 2021  (IN) .............................. 202141051678

(51) Int. Cl.
  *G06F 16/23*  (2019.01)
  *G06F 11/14*  (2006.01)
  *G06F 16/25*  (2019.01)
(52) U.S. Cl.
  CPC ...... *G06F 11/1464* (2013.01); *G06F 11/1461* (2013.01); *G06F 16/2358* (2019.01); *G06F 16/25* (2019.01)

(58) Field of Classification Search
  None
  See application file for complete search history.

(56) References Cited

U.S. PATENT DOCUMENTS

| | | | | |
|---|---|---|---|---|
| 9,785,510 | B1* | 10/2017 | Madhavarapu | G06F 3/065 |
| 10,565,065 | B2* | 2/2020 | Guzik | G06F 11/1464 |
| 10,719,405 | B2* | 7/2020 | Luo | G06F 11/1451 |
| 11,176,008 | B2 | 11/2021 | Taranov et al. | |
| 11,216,441 | B1* | 1/2022 | Chen | G06F 11/3006 |
| 11,301,336 | B2 | 4/2022 | Sarkar et al. | |
| 12,001,293 | B2* | 6/2024 | Mufti | G06F 11/1484 |
| 2021/0149703 | A1 | 5/2021 | Patle et al. | |
| 2022/0114175 | A1* | 4/2022 | Kondiles | H04L 45/02 |
| 2023/0004462 | A1* | 1/2023 | Shao | G06F 11/1448 |

* cited by examiner

*Primary Examiner* — Elias Mamo
(74) *Attorney, Agent, or Firm* — Holland & Hart LLP

(57) ABSTRACT

Methods, systems, and computer programs are presented for providing backup services to a database. One method includes operations for installing a backup agent in a first database, receiving information about the first database, and executing, by the backup agent, queries to the first database to determine a topology of the first database. Further, the method includes configuring, based on the topology, a receiver service of a second database for backing up the first database in the second database. The backup agent configures an interface module of the first database to back up the first database to the second database. The configuration includes an interface to the receiver service of the second database and connection information for storing data in one or more nodes of the second database. The interface module streams updates from the first database to the second database based on the configuration of the interface module.

20 Claims, 11 Drawing Sheets

INTEGRATION OF DATABASE WITH DISTRIBUTED STORAGE SYSTEM

CROSS REFERENCE

The present Application for Patent is a continuation of U.S. patent application Ser. No. 17/586,689 by YERRAPRAGADA et al., entitled "INTEGRATION OF DATABASE WITH DISTRIBUTED STORAGE SYSTEM" and filed Jan. 27, 2022, which claims priority to Indian Patent Application No. 202141051678 by YERRAPRAGADA et al., entitled "INTEGRATION OF DATABASE WITH DISTRIBUTED STORAGE SYSTEM" and filed Nov. 11, 2021, each of which is assigned to the assignee hereof and expressly incorporated by reference herein.

TECHNICAL FIELD

The subject matter disclosed herein generally relates to methods, systems, and machine-readable storage media for providing backups in a storage system.

BACKGROUND

The volume and complexity of data that is collected, analyzed, and stored are increasing rapidly over time. The computer infrastructure used to handle this data is also becoming more complex, with more processing power and more portability. As a result, data management and storage are becoming increasingly important.

Some databases provide features not available in other databases, and users would like to obtain the benefits of two databases by integrating the two databases to work together. However, integrating the functionality of multiple databases may be complex due to the particulars of each technology.

BRIEF DESCRIPTION OF THE DRAWINGS

Various of the appended drawings merely illustrate example embodiments of the present disclosure and cannot be considered as limiting its scope.

DETAILED DESCRIPTION

Figure 1A:
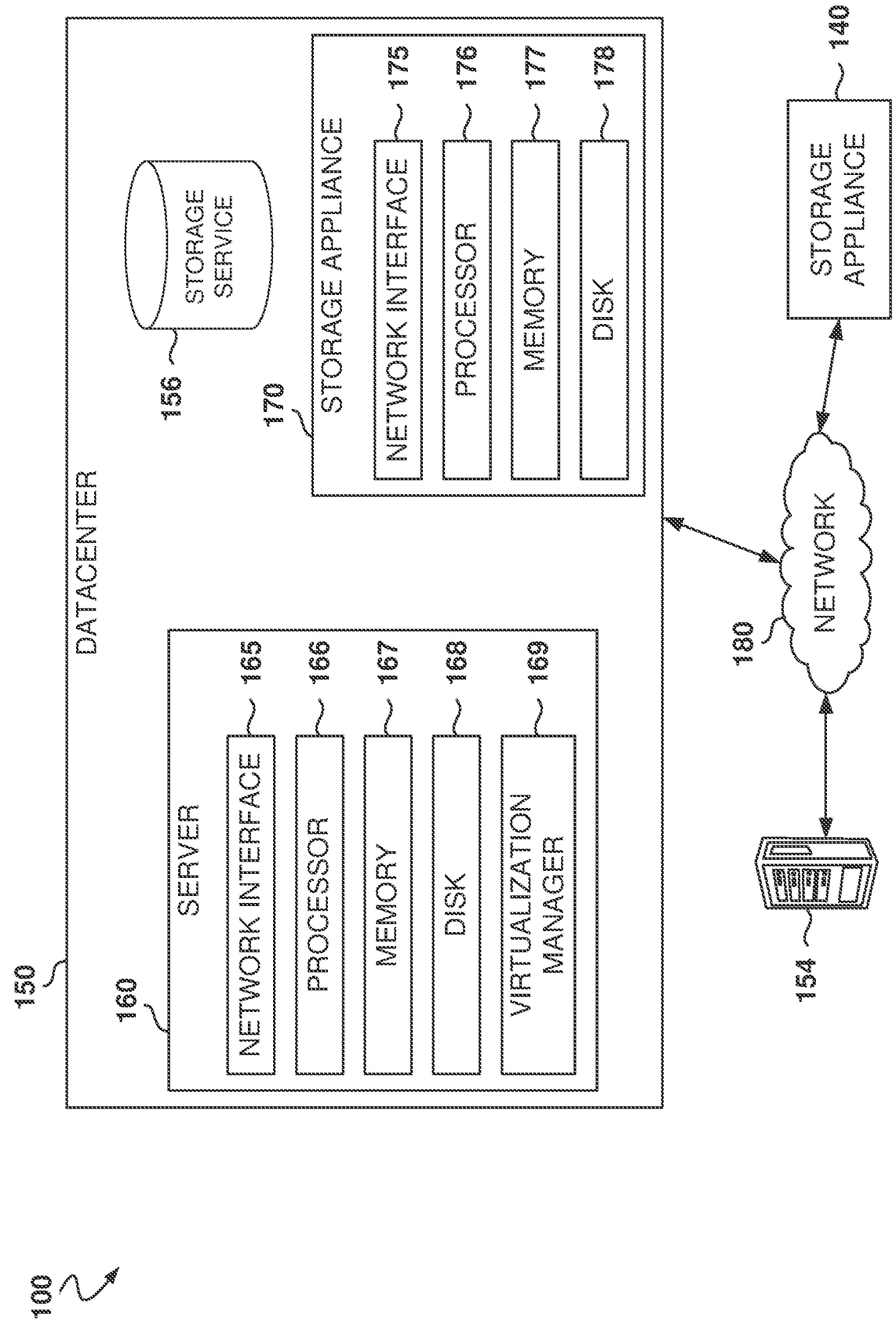
FIG. 1A is a block diagram illustrating an example networked computing environment in which some embodiments described herein are practiced.

Example methods, systems, and computer programs are directed to providing backup services to a database. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one aspect, a Cloud Data Management (CDM) system is used as a storage layer for a third-party database (TPD). An agent of the CDM is installed in a TPD host and interacts with a Receiver Service (RS) in the CDM to facilitate the interactions between the CDM and the TPD. The agent may perform multiple operations, such as writing sequential data to a CDM cluster, deduplicating stored files, reading from backed up files, inquiring about the backed-up files, and requesting deletion of the backed-up files.

In one example, an integration with an SAP HANA database is described, but the same principles may be utilized for integrating with other databases, such as DB2, PostgreSQL, etc. When a backup, restore, inquire or delete is triggered on the SAP HANA database, a Backint interface, available for interacting with SAP HANA, is used to send commands to the receiver service on the CDM.

In one example, the CDM is the Rubrik Polaris data management system and the TPD is the SAP HANA database. The integration of SAP HANA with the Rubrik Polaris data management system provides multiple benefits that include a user interface for backing up data and configuring backups, unified solution for server and cloud implementations, automated discovery, automated protection, central reporting, easy scale up and scale out, easy addition and discovery of SAP HANA databases, assignment of service level agreements (SLAs), setting SLA policy for full, differential and incremental backups, elimination of the need for manual scripts for backing up data, and support of multi-channel streaming.

One method includes operations for installing a backup agent in a first database system, receiving information about the first database system, and executing, by the backup agent, queries to the first database system to determine a topology of the first database system. Further, the method includes an operation for configuring, based on the topology, a receiver service of a second database system for backing up the first database system in the second database system. The backup agent configures an interface module of the first database system to back up the first database system to the second database system. The configuration includes an interface to the receiver service of the second database system and connection information for storing data in one or more nodes of the second database system. The interface module streams updates from the first database system to the second database system based on the configuration of the interface module.

Glossary

File object and file: a file object refers to a logical abstraction of a file, and a file refers to a specific version or instance of a file object. For example, a file object may refer to a volume of a database and files may refer to different backup versions of the volume. In some cases, the file object is identified by a filename, and a file is identified by a filename plus a creation timestamp.

SLA Lock: an SLA lock on a file is a mechanism to retain a file and preventing the file from being deleted). The RS deletes a file after a period of time (e.g., thirty days) if the file does not have the SLA Lock.

Backint: Third-party backup tools can be integrated with SAP HANA to perform backup and recovery operations from SAP HANA studio, SAP HANA cockpit, and use native SQL. Communications with the SAP HANA database are done via the Backint for SAP HANA interface. Backint for SAP HANA uses named pipes to back up the database, and performs actions needed to manage external storage. Each active host in a distributed SAP HANA system may have one or more volumes to be backed up. When Backint for SAP HANA is used to back up a database, several communication processes are started, one for each volume. Backint-based data backups and log backups can be created in parallel.

FIG. 1A is a block diagram illustrating one embodiment of a networked computing environment 100 in which some embodiments are practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network (SAN) storage device, a NAS, a hard disk drive (HDD), a solid-state drive (SSD), or a data storage system.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The storage appliance 170 may include a data management system for backing up virtual machines and/or files within a virtualized infrastructure. The server 160 may be used to create and manage one or more virtual machines associated with a virtualized infrastructure. The one or more virtual machines may run various applications, such as a cloud-based service, a database application or a web server. The storage device 156 may include one or more hardware storage devices for storing data, such as a HDD, a magnetic tape drive, a SSD, a SAN storage device, or a NAS device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., SSDs and HDDs) and relatively lower-cost, lower-performance storage devices (e.g., magnetic tape drives).

The one or more networks 180 may include a secure network such as an enterprise private network, an unsecure network such as a wireless open network, a local area network (LAN), a wide area network (WAN), and the Internet. The one or more networks 180 may include a cellular network, a mobile network, a wireless network, or a wired network. Each network of the one or more networks 180 may include hubs, bridges, routers, switches, and wired transmission media such as a direct-wired connection. The one or more networks 180 may include an extranet or other private network for securely sharing information or providing controlled access to applications or files.

A server, such as server 160, may allow a client to download information or files (e.g., executable, text, application, audio, image, or video files) from the server or perform a search query related to particular information stored on the server. In some cases, a server may act as an application server or a file server. In general, a server may refer to a hardware device that acts as the host in a client-server relationship or a software process that shares a resource with or performs work for one or more clients.

One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167. Processor 166 may include one or more processing units or processing devices, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. The virtualization manager 169 may manage the provisioning of virtual machines running within the virtualized infrastructure and provide an interface to computing devices interacting with the virtualized infrastructure. In one example, the virtualization manager 169 may set a virtual machine into a frozen state in response to a snapshot request made via an application programming interface (API) by a storage appliance, such as storage appliance 170. Setting the virtual machine into a frozen state may allow a point in time snapshot of the virtual machine to be stored or transferred. In one example, updates made to a virtual machine that has been set into a frozen state may be written to a separate file (e.g., an update file) while the virtual disk file associated with the state of the virtual disk at the point in time is frozen. The virtual disk file may be set into a read-only state to prevent modifications to the virtual disk file while the virtual machine is in the frozen state. The virtualization manager 169 may then transfer data associated with the virtual machine (e.g., an image of the virtual machine or a portion of the image of the virtual machine) to a storage appliance in response to a request made by the storage appliance. After the data associated with the point in time snapshot of the virtual machine has been transferred to the storage appliance, the virtual machine may be released from the frozen state (i.e., unfrozen) and the updates made to the virtual machine and stored in the separate file may be merged into the virtual disk file. The virtualization manager 169 may perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of 1000 virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment. In one example, networked computing environment 100 may provide cloud-based work productivity or business-related applications to a computing device, such as computing device 154. The storage appliance 140 may comprise a cloud-based data management (CDM) system for backing up virtual machines and/or files within a virtualized infrastructure, such as virtual machines running on server 160 or files stored on server 160.

In some cases, networked computing environment 100 may provide remote access to secure applications and files stored within data center 150 from a remote computing device, such as computing device 154. The data center 150 may use an access control application to manage remote access to protected resources, such as protected applications, databases, or files located within the data center. To facilitate remote access to secure applications and files, a secure network connection may be established using a virtual private network (VPN). A VPN connection may allow a remote computing device, such as computing device 154, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours, for example.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface (GUI)) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5/Version23). In one example, the storage appliance 170 may run an NFS server and make the particular version (or a copy of the particular version) of the virtual machine accessible for reading and/or writing. The end user of the storage appliance 170 may then select the particular version to be mounted and run an application (e.g., a data analytics application) using the mounted version of the virtual machine. In another example, the particular version may be mounted as an iSCSI target.

In some embodiments, the management system provides management of one or more clusters of nodes as described herein, such as management of one or more policies with respect to the one or more clusters of nodes. The management system can serve as a cluster manager for one or more clusters of nodes (e.g., present in the networked computing environment 100). According to various embodiments, the management system provides for central management of policies (e.g., SLAs) that remotely manages and synchronizes policy definitions with clusters of nodes. For some embodiments, the management system facilitates automatic setup of secure communications channels between clusters of nodes to facilitate replication of data. Additionally, for some embodiments, the management system manages archival settings for one or more clusters of nodes with respect to cloud-based data storage resource provided by one or more cloud service provider.

Figure 1B:
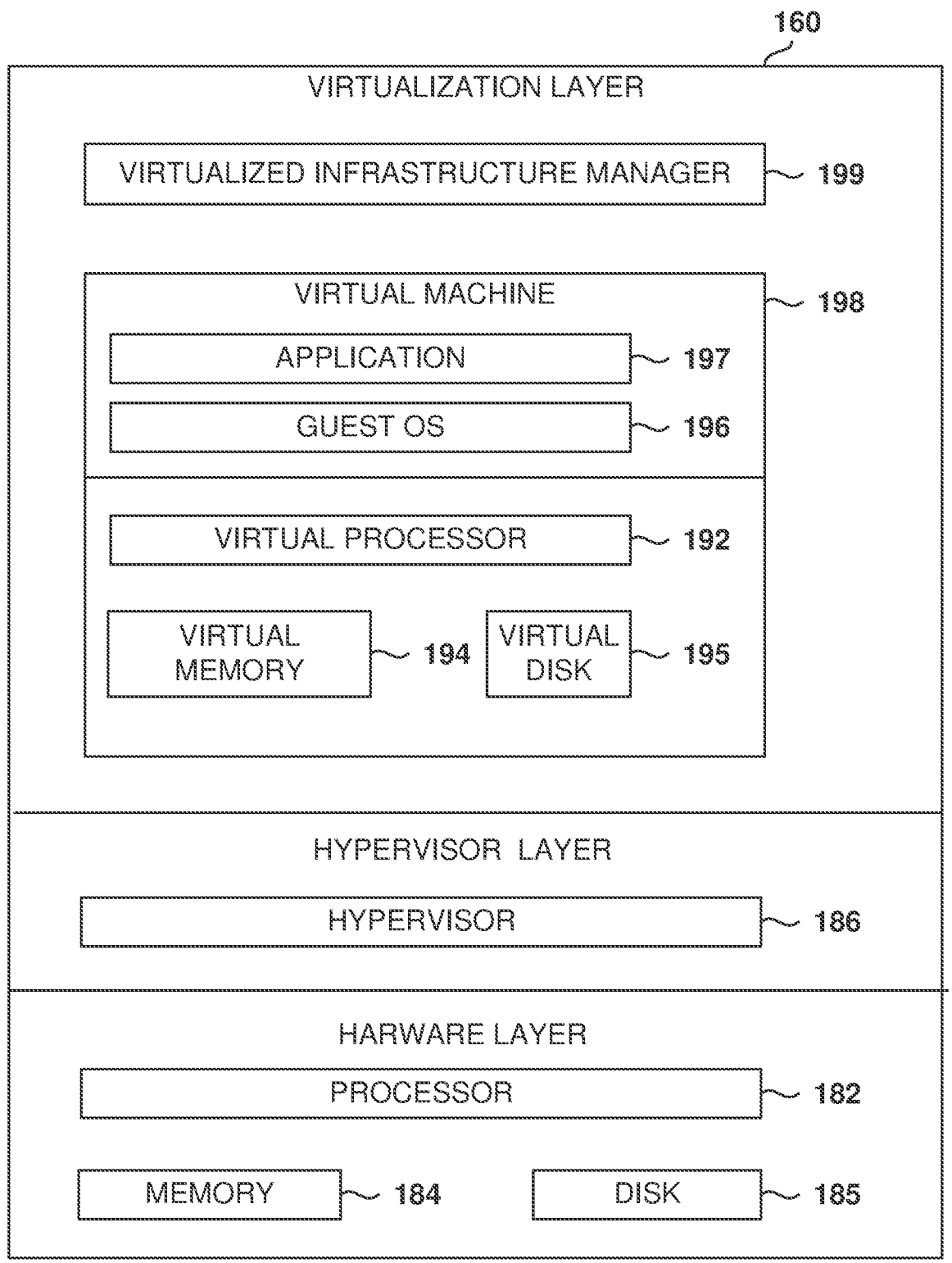
FIG. 1B is a block diagram illustrating one embodiment of a server in the example networked computing environment of FIG. 1A.

FIG. 1B is a block diagram illustrating one embodiment of server 160 in FIG. 1A. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197.

The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines. The virtualized infrastructure manager 199 may manage the provisioning of virtual machines running within the virtualized infrastructure and provide an interface to computing devices interacting with the virtualized infrastructure. The virtualized infrastructure manager 199 may perform various virtualized infrastructure related tasks, such as cloning virtual machines, creating new virtual machines, monitoring the state of virtual machines, and facilitating backups of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time (e.g., 5:30 p.m. on Jun. 29, 2024) and a second snapshot of the virtual machine may correspond with a second state of the virtual machine at a second point in time subsequent to the first point in time (e.g., 5:30 p.m. on Jun. 30, 2024).

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer data associated with virtual blocks stored on a virtual disk of the virtual machine that have changed since the last snapshot of the virtual machine was taken. In one embodiment, the data management application may specify a first point in time and a second point in time and the virtualized infrastructure manager 199 may output one or more virtual data blocks associated with the virtual machine that have been modified between the first point in time and the second point in time.

In some embodiments, the server 160 may or the hypervisor 186 may communicate with a storage appliance, such as storage appliance 140 in FIG. 1A or storage appliance 170 in FIG. 1A, using a distributed file system protocol such as NFS. The distributed file system protocol may allow the server 160 or the hypervisor 186 to access, read, write, or modify files stored on the storage appliance as if the files were locally stored on the server. The distributed file system protocol may allow the server 160 or the hypervisor 186 to mount a directory or a portion of a file system located within the storage appliance.

Figure 1C:
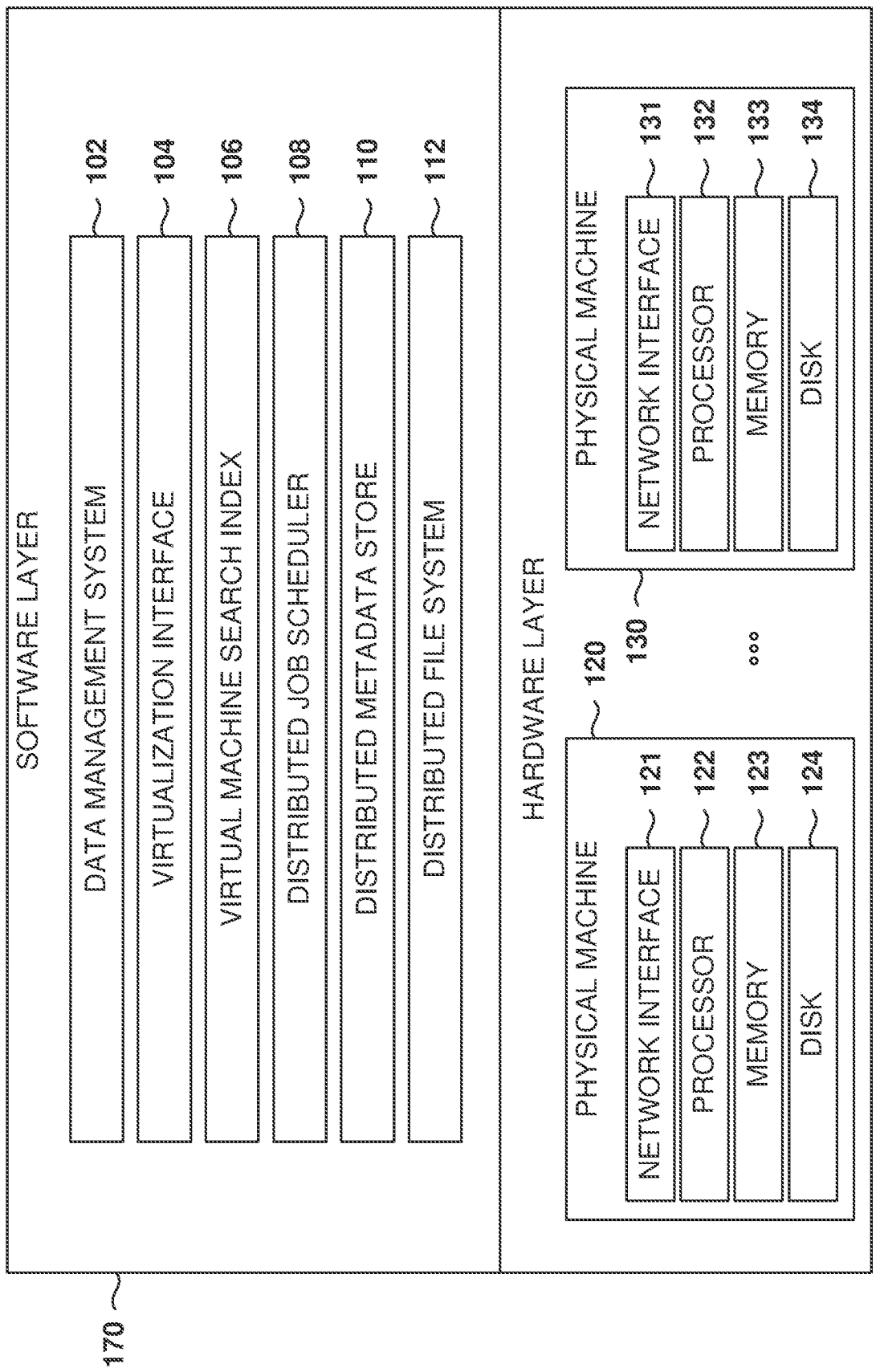
FIG. 1C is a block diagram illustrating one embodiment of a storage appliance in the example networked computing environment of FIG. 1A.

FIG. 1C is a block diagram illustrating one embodiment of storage appliance 170 in FIG. 1A. The storage appliance may include a plurality of physical machines that may be grouped together and presented as a single computing system. Each physical machine of the plurality of physical machines may comprise a node in a cluster (e.g., a failover cluster). In one example, the storage appliance may be positioned within a server rack within a data center. As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a HDD and/or a SDD. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a HDD and/or a SDD. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

In some embodiments, the plurality of physical machines may be used to implement a cluster-based network file server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 160 in FIG. 1A, or a hypervisor, such as hypervisor 186 in FIG. 1B, to communicate with the storage appliance 170 may not provide a failover mechanism (e.g., NFS Version 3). In the case that no failover mechanism is provided on the client-side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 186 in FIG. 1B may be configured with a first floating IP address associated with a first node in the cluster. The hypervisor may connect to the cluster using the first floating IP address. In one example, the hypervisor may communicate with the cluster using the NFS Version 3 protocol. Each node in the cluster may run a Virtual Router Redundancy Protocol (VRRP) daemon. A daemon may comprise a background process. Each VRRP daemon may include a list of floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of node(j) may be (j−i) modulo N. In another example, given a number (N) of nodes in a cluster from node(0) to node(N−1), for a floating IP address (i), the VRRP priority of node(j) may be (i−j) modulo N. In these cases, node(j) will assume floating IP address (i) if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 1C, the software-level components of the storage appliance 170 may include data management system 102, a virtualization interface 104, a distributed job scheduler 108, a distributed metadata store 110, a distributed file system (DFS) 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks. Each of the one or more chunks may be stored within the distributed file system 112 as a separate file.

In some embodiments, the data management system 102 resides inside the distributed file system 112. The data management system 102 may receive requests to capture snapshots of the entire distributed file system 112 on a periodic basis based on internal protocols or upon occurrence of user triggered events.

The files stored within the distributed file system 112 may be replicated or mirrored over a plurality of physical machines, thereby creating a load-balanced and fault tolerant distributed file system. In one example, storage appliance 170 may include ten physical machines arranged as a failover cluster, and a first file corresponding with a snapshot of a virtual machine (e.g., /snapshots/VM_A/s1/s1.full) may be replicated and stored on three of the ten machines.

The distributed metadata store 110 may include a distributed database management system that provides high availability without a single point of failure. In one embodiment, the distributed metadata store 110 may comprise a database, such as a distributed document-oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals.

The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 108 may schedule a specific job to be run on a particular node based on data stored on the particular node. For example, the distributed job scheduler 108 may schedule a virtual machine snapshot job to be run on a node in a cluster that is used to store snapshots of the virtual machine in order to reduce network congestion.

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster. In one example, the distributed job scheduler 108 may run a first set of job scheduling processes on a first node in the cluster, a second set of job scheduling processes on a second node in the cluster, and a third set of job scheduling processes on a third node in the cluster. The first set of job scheduling processes, the second set of scheduling processes, and the third set of job scheduling processes may store information regarding jobs, schedules, and the states of jobs using a metadata store, such as distributed metadata store 110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within 3 minutes from being started). In response to detecting jobs that have failed to be updated within the threshold period of time, the distributed job scheduler 108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 108 may ensure that each task of the series of tasks is executed based on the ordering of tasks. Tasks that do not have dependencies with each other may be executed in parallel.

In some cases, the distributed job scheduler 108 may schedule each task of a series of tasks to be performed on a specific node in a cluster. In other cases, the distributed job scheduler 108 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster. In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 108 may assign one or more tasks associated with a job to be executed on a particular node in a cluster based on the location of data required to be accessed by the one or more tasks.

In one embodiment, the distributed job scheduler 108 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 199 in FIG. 1B, to create a frozen copy of the virtual machine and to transfer one or more chunks (or one or more files) associated with the frozen copy to a storage appliance, such as storage appliance 170 in FIG. 1A. The one or more tasks may also include generating metadata for the one or more chunks, storing the metadata using the distributed metadata store 110, storing the one or more chunks within the distributed file system 112, and communicating with the virtualized infrastructure manager that the virtual machine the frozen copy of the virtual machine may be unfrozen or released for a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2024), and a file path to where the first chunk is stored within the distributed file system 112 (e.g., the first chunk is located at /snapshots/VM_B/s1/s1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 104 may provide an interface for communicating with a virtualized infrastructure manager managing a virtualization infrastructure, such as virtualized infrastructure manager 199 in FIG. 1B, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine). In this case, storage appliance 170 may request and receive data from a virtualized infrastructure without requiring agent software to be installed or running on virtual machines within the virtualized infrastructure. The virtualization interface 104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that includes the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

In one embodiment, as each snapshot of a virtual machine is ingested each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 112 in FIG. 1C.

The data management system 102 may comprise an application running on the storage appliance that manages and stores one or more snapshots of a virtual machine. In one example, the data management system 102 may comprise a highest level layer in an integrated software stack running on the storage appliance. The integrated software stack may include the data management system 102, the virtualization interface 104, the distributed job scheduler 108, the distributed metadata store 110, and the distributed file system 112. In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine, and/or manage operations in online data format conversion during file transfer to a remote location, for example. More specific operations in example data format conversion techniques are discussed further below.

Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

Figure 2:
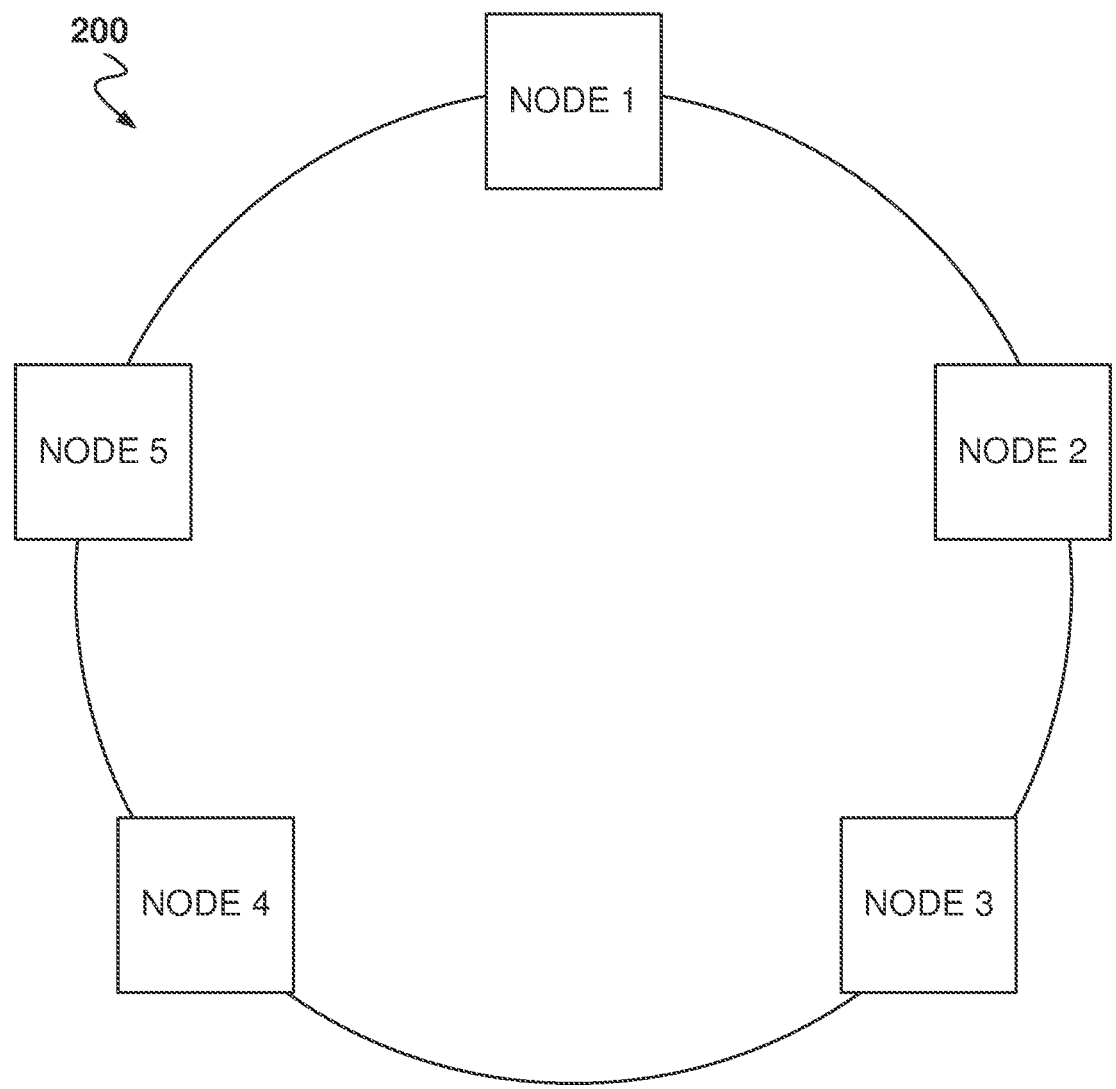
FIG. 2 is a block diagram illustrating an example cluster of a distributed decentralized database, according to some example embodiments.

FIG. 2 is a block diagram illustrating an example cluster 200 of a distributed decentralized database, according to some example embodiments. As illustrated, the example cluster 200 includes five nodes, nodes 1-5. In some example embodiments, each of the five nodes runs from different machines, such as physical machine 130 in FIG. 1C or virtual machine 198 in FIG. 1B. The nodes in the example cluster 200 can include instances of peer nodes of a distributed database (e.g., cluster-based database, distributed decentralized database management system, a NoSQL database, Apache Cassandra, DataStax, MongoDB, CouchDB), according to some example embodiments. The distributed database system is distributed in that data is sharded or distributed across the example cluster 200 in shards or chunks and decentralized in that there is no central storage device and no single point of failure. The system operates under an assumption that multiple nodes may go down, up, become non-responsive, and so on. Sharding is splitting up of the data horizontally and managing each shard separately on different nodes. For example, if the data managed by the example cluster 200 can be indexed using the 26 letters of the alphabet, node 1 can manage a first shard that handles records that start with A through E, node 2 can manage a second shard that handles records that start with F through J, and so on.

In some example embodiments, data written to one of the nodes is replicated to one or more other nodes per a replication protocol of the example cluster 200. For example, data written to node 1 can be replicated to nodes 2 and 3. If node 1 prematurely terminates, node 2 and/or 3 can be used to provide the replicated data. In some example embodiments, each node of example cluster 200 frequently exchanges state information about itself and other nodes across the example cluster 200 using gossip protocol. Gossip protocol is a peer-to-peer communication protocol in which each node randomly shares (e.g., communicates, requests, transmits) location and state information about the other nodes in a given cluster.

Writing: For a given node, a sequentially written commit log captures the write activity to ensure data durability. The data is then written to an in-memory structure (e.g., a memtable, write-back cache). Each time the in-memory structure is full, the data is written to disk in a Sorted String Table data file. In some example embodiments, writes are automatically partitioned and replicated throughout the example cluster 200.

Reading: Any node of example cluster 200 can receive a read request (e.g., query) from an external client. If the node that receives the read request manages the data requested, the node provides the requested data. If the node does not manage the data, the node determines which node manages the requested data. The node that received the read request then acts as a proxy between the requesting entity and the node that manages the data (e.g., the node that manages the data sends the data to the proxy node, which then provides the data to an external entity that generated the request).

The distributed decentralized database system is decentralized in that there is no single point of failure due to the nodes being symmetrical and seamlessly replaceable. For example, whereas conventional distributed data implementations have nodes with different functions (e.g., master/slave nodes, asymmetrical database nodes, federated databases), the nodes of example cluster 200 are configured to function the same way (e.g., as symmetrical peer database nodes that communicate via gossip protocol, such as Cassandra nodes) with no single point of failure. If one of the nodes in example cluster 200 terminates prematurely ("goes down"), another node can rapidly take the place of the terminated node without disrupting service. The example cluster 200 can be a container for a keyspace, which is a container for data in the distributed decentralized database system (e.g., whereas a database is a container for containers in conventional relational databases, the Cassandra keyspace is a container for a Cassandra database system).

Figure 3A:
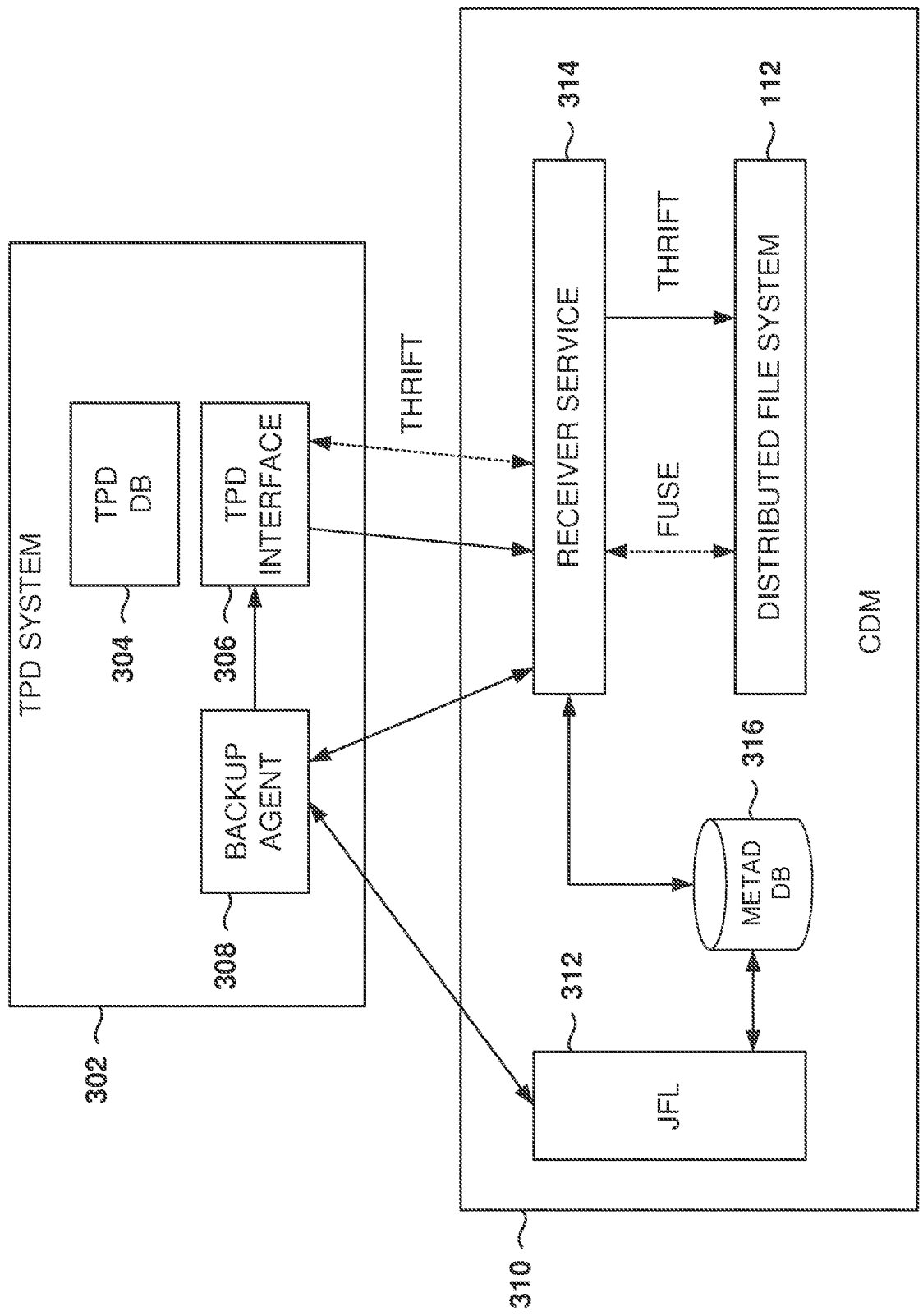
FIGS. 3A-3B illustrate an architecture for providing storage to an external database, according to some example embodiments.
Figure 3B:
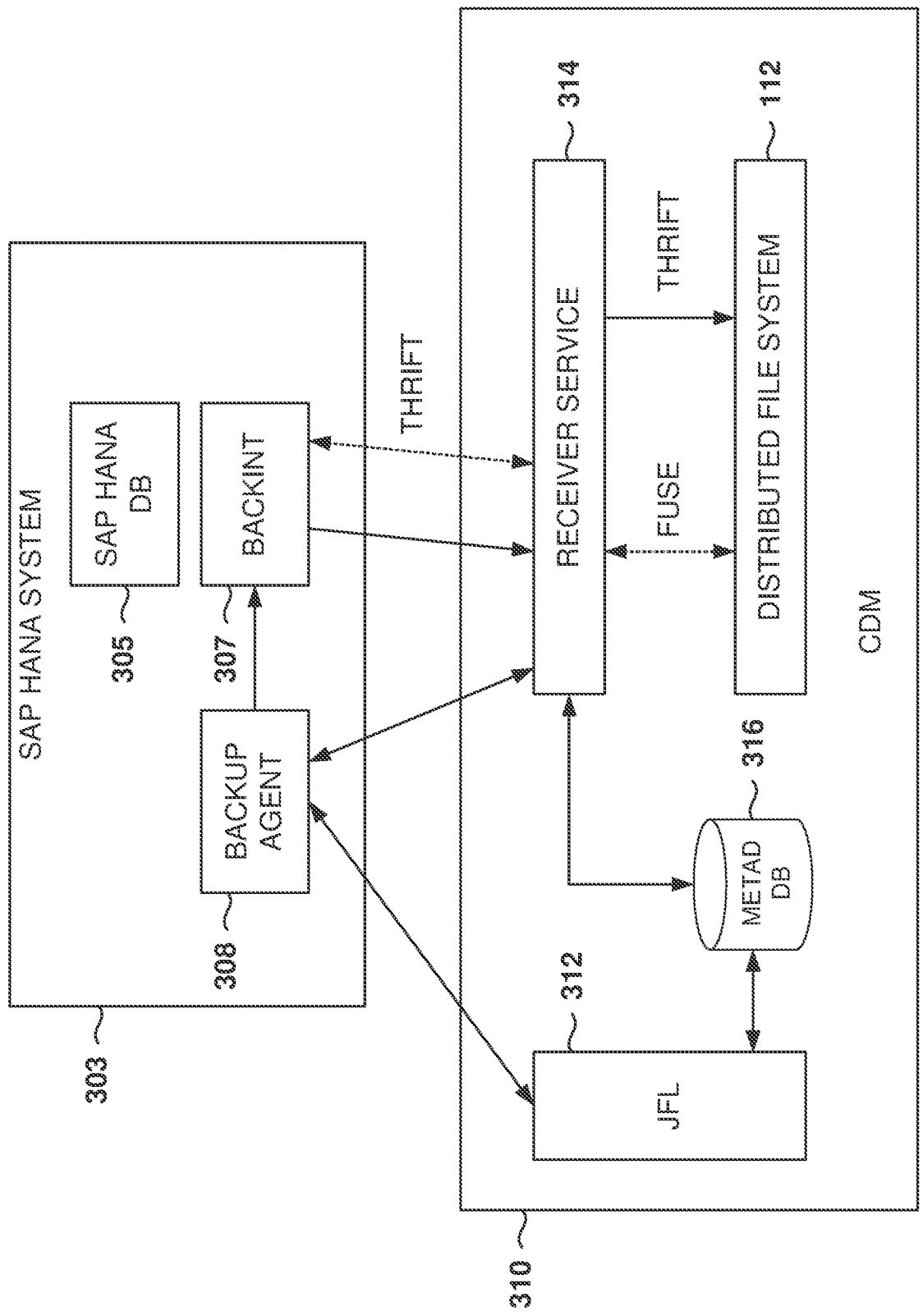

FIG. 3A illustrates an architecture for providing storage to an external database, according to some example embodiments. FIG. 3B illustrates an example of the architecture for implementing an SAP HANA System 303. The TPD system 302 comprises multiple isolated databases and may consist of one host or a cluster of several hosts. The TPD system 302 is identified by a single system ID (SID) and contains one or more tenant databases and one system database. In some example embodiments, databases are identified by a SID and a database name. The TPD system 302 may consist of one host or a cluster of several hosts, referred to as a multiple-host, distributed system, or scale-out system. The containers for individual databases can be moved and expanded from one host to another as configured by the TPD administrator.

In some example environments, the TPD system 302 includes a TPD interface 306 for exchanging commands and data with the backup agent 308. Further, the backup agent 308 is installed within the TPD system 302 to interact with the TPD DB 304 via the TPD interface 306. For example, the TPD interface 306 reads the data from the TPD DB 304 and sends the data to CDM 310. For the SAP HANA system 303 of FIG. 3B, the TPD interface is a Backint 306 interface to SAP HANA DB, and the TPD DB 304 is a SAP HANA DB 305.

In some example embodiments, CDM 310 includes a receiver service 314, the DFS 112, one or more metadata databases 316, and a job fetch loop (JFL) 312 module. The receiver service 314 interacts with the TPD system 302 via the TPD interface 306 and with the backup agent 308 to send commands for the TPD DB 304 via the TPD interface 306.

Further, the JFL 312 manages the scheduling of jobs for accessing the TPD system 302. The one or more metadata databases 316 are used to store metadata about the files stored in the DFS 112 to facilitate search operations (e.g., by identifying search tags). In some example environments, the client can specify metadata associated with a file while creating it. In some example embodiments, the receiver service 314 supports two types of metadata: file tags and application metadata. For example, the file tags may have the format {Key: Value} pairs which support equality (==) filter. The application metadata is a byte stream which will be returned in the result of an inquiry.

The CDM 310 performs auto discovery of the configuration of the TPD DB 304 based on information provided by the administrator. The backup agent 308 acts as a connector between CDM 310 and the TPD system 302. For example, the backup agent 308 can perform SQL queries and commands for the SAP HANA DB 305 during discovery and backup. Further, the backup data is pushed to DFS 112 by the TPD interface 306.

During backup, the CDM 310 triggers the backup on the TPD system 302 and collects metadata for the stored data. Further, the metadata related to discovered objects, snapshots (backups), space, failures, is synced to CDM 310 for reporting.

In some example embodiments, the receiver service 314 executes as a service on the nodes of the CDM cluster and exposes endpoints which the backup agent 308 for backups and restores. In some example embodiments, the receiver service 314 exposes endpoints for the following workflows: backup file (e.g., write), inquire files, restore file (e.g., read), set SLA lock on files, and delete file.

In some example embodiments, the receiver service 314 communicates with the metadata DB 316 via gRPC for metadata operations related to chain management of backups. Further, the receiver service 314 communicates with DFS 112 via FUSE protocol for data operations such as writing data to patch files, reading data from merged files, etc., and via Thrift for operations such as creating a merged file from a chain of patch files.

The CDM 310 allows the customer to set up a backup policy for the TPD system 302, such as frequency of full backups and incremental backups. Further, the receiver service 314 and the backup agent 308 improve the performance of backups, such as being able to process high frequency backups (e.g., a file being written every minute). The backup policy in CDM 310 provides the point of persistence for every backed file in the TPD system 302, protecting the files against data loss.

The receiver service 314 is scalable across all the nodes in the cluster of the DFS 112, such that if additional notes are added to DFS 112, the TPD interface 306 is able to write to the different nodes in DFS 112. The log files may be spread across the nodes in the cluster, which allows the TPD interface 306 to have a higher bandwidth to store data because there are more nodes available.

In some example environments, the receiver service 314 provides IP (Internet Protocol) addresses of the nodes in the DFS 112 and the TPD interface 306 selects a node at random while performing a write. The receiver service 314 changes the list of IP addresses based on the state of the system, such as capacity at each of the nodes, nodes coming down, nodes being added, etc. The change of IP addresses may be performed at any time to improve performance (e.g., every five minutes, fifteen minutes).

In some example embodiments, the CDM provides a custom Thrift protocol for storing the data in DFS 112, instead of having to use NFS. Thrift is a remote procedure call (RPC) protocol.

The TPD system 302 communicates with the receiver service 314 for database operations and the internal structure of DFS 112 is hidden so the TPD system 302 does not need to address implementation details, such as the location and name of the files being written into DFS 112. DFS 112 utilizes its own file format that that is immutable and facilitates file deduplication.

To write data, the TPD system 302 opens a file in DFS 112, writes to the file, and then closes the file. The TPD system may provide additional information about the file, such as tags used for search and indexing.

The client may select to perform deduplication in DFS 112. In some example embodiments, the file name provided by the TPD system 302 is used for deduplicating, such that duplicate files with the same name will be deduped.

If the client wishes to restore a file from a previous backup, the TPD interface 306 uses the name of the file and the indication of the time to be restored, and the CDM 310 will restore the file based on a full backup and zero or more incremental backups.

In some example embodiments, the receiver service 314 communicates with DFS 112 using a plurality of functions, as described in the following table:

TABLE 1

| Function | Input Parameters | Output Parameters |
| --- | --- | --- |
| openPatchFile | Output Patch File Path Chain of Base Patch Files to dedupe against | Status |
| writeToPatchFile | Patch File Path Offset: Data | Status |
| closePatchFile | File Handle Logical Size | Status Patch File Info |
| openMergedFile | Merged Spec: List | Status File Path |
| readFromMergedFile | File Path Offset: Size | Status Data Read |
| cleanupMergedFile | File Handle | Status |

Further, openPatchFile is to create and open a patch file at the desired path. If the base patch file chain is provided, this needs to instantiate a dedupe engine so that the incoming data gets fixed size non-aligned deduplication. The method for implementation includes instantiating a PatchFileBuilder with the dedupe engine, sending a request to create a file via FUSE, and saving (in-memory) the mapping of patch file path to the (patch file builder, dedupe engine). Further, the writeToPatchFile is to write to the patch file specified by the file path via FUSE.

The integration of CDM 310 with the SAP HANA system 302 provides the following features:

Ability to auto-discover SAP systems and DBs;
Ability to assign SLAs at SAP system-level and DB-level.
Leverage CDM's native data transfer protocol (this takes care of moving backup data from SAP instance into CDM storage directly);
Orchestrate backups (full or incrementals) based on defined SLAs;
Ability to monitor completion status of backups through events and reporting in CDM 310;
Provide a recoverable range in CDM 310 UI so recovery can be triggered using third-party tools; and
Manage backup retention and based on the SLA policy.

Figure 4:
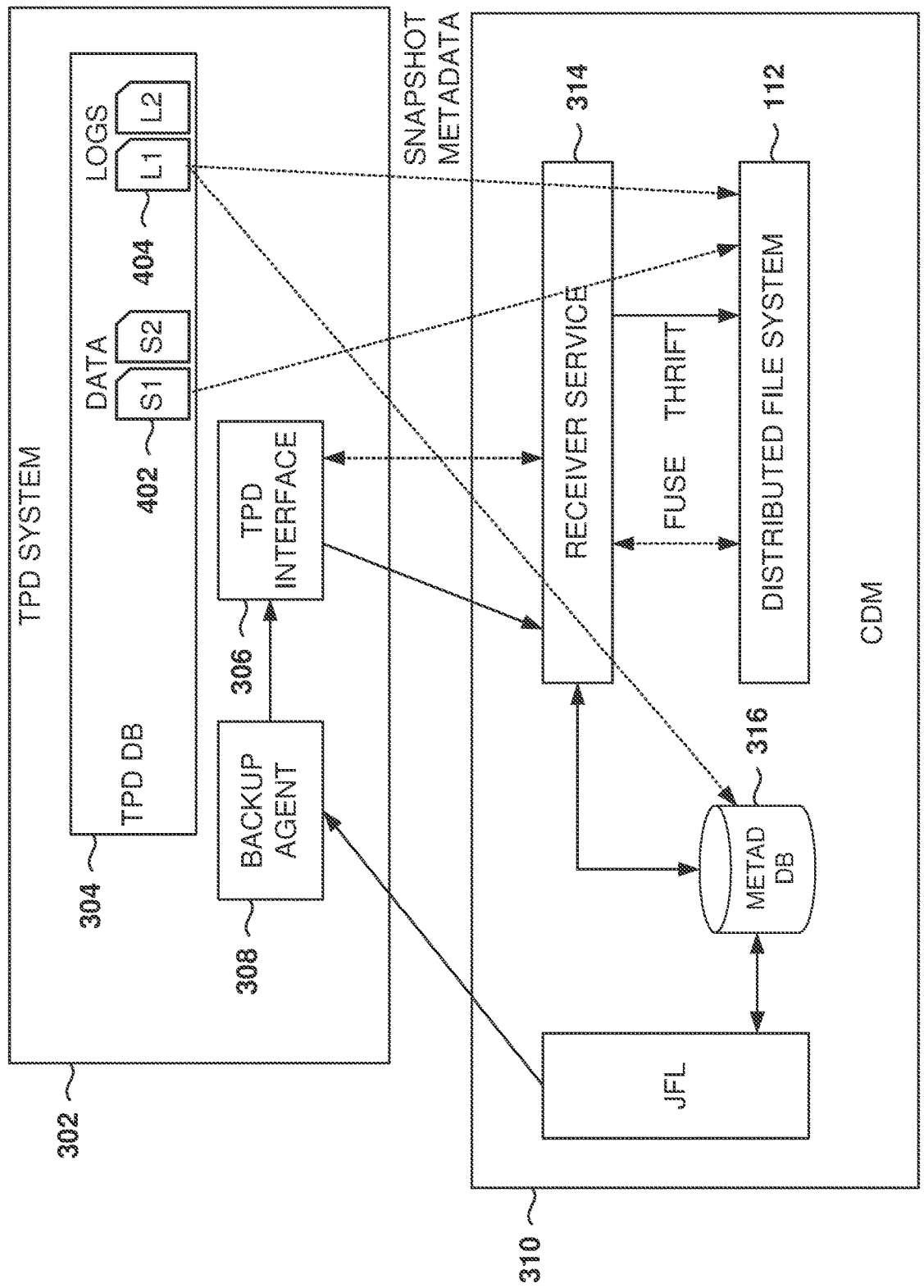
FIG. 4 illustrates the processing of data and transaction logs, according to some example embodiments.

FIG. 4 illustrates the processing of data and transaction logs, according to some example embodiments. When the TPD DB 304 (e.g., SAP HANA DB) writes to CDM 310, the TPD DB 304 transmits data 402 (e.g., S1, S2) and transaction logs 404, also referred to herein as logs (e.g., L1, L2).

The data 402 includes the content of the files to be stored and the logs include information regarding the file being stored, including which section of the file is being stored and a timestamp of the time of the write. A transaction log 404 (also referred to as a transaction journal, a database log, a binary log, or an audit trail) is a history of actions executed by a database management system used to guarantee atomicity, consistency, isolation, and durability over crashes or hardware failures. Physically, a log is a file listing changes to the database, stored in a stable storage format.

The data 402 is stored in the DFS 112 and the logs 404 are stored in one or more metadata databases 316. The logs 404 are used to implement backups for the TPD DB 304, including full and incremental backups.

If the user wants to recover a file for a given time, the user provides the file name and the timestamp, and the DFS 112 retrieves the state if the file for the desired time based on a full backup previous to the timestamp and incremental backups, if any, until the desired timestamp.

The logs 404 are streamed using the TPD interface 306. For example, the SAP HANA system 303 streams the logs and the data, but the CDM 310 has no control over the timelines of the transfers. Thus, CDM 310 controls how long to keep the backed-up files, but not how the logs are written to CDM 310. For example, the SAP HANA system 303 may have a buffer for streaming the logs, but the buffering may suffer different amounts of delay, so CDM can not make assumptions that the current stored information is up to date.

In some example embodiments, the individual log snapshots pack multiple log files and these form a logical sequence based on the backup ID with failover to file-creation time in case the backup ID is the same. Each of these log snapshots form a sequential chain, and the log backups are almost continuous in nature and they form a sequential chain from TPD's perspective for a service, but at the same time these log files are dependent on full backups to create a consistent point in time state of the database. The same chain is maintained in two levels in CDM 310: the sequence of log snapshots and the sequence of log backups within the snapshot. For any point in time recovery, a full backup has to be selected and the log snapshots from that time to the selected recovery time are exposed to the TPD system. In some cases, the second level of chaining is required because SAP API may demand files in sequential order.

The receiver service 314 utilizes a table backup_file_metadata for keeping information regarding the services provided to the TPD system 302. In some example embodiments, the information is stored according to the following schema:

```
// File object identifiers
string database_identifier
string file_object_name
string backup_type
// Identification of a file within a file object.
datetime start_time
string primary_tag
// Internal UUID. To be used in logging (Allow searching logs
       for all operations on a file by its uuid).
uuid file_uuid
// File Metadata
// key-value collection
string file_tags
// opaque metadata
string app_metadata
// Is SLA lock held on the file.
bool sla_lock
// If the file has been requested to be deleted via the deleteFile endpoint.
bool is_marked_for_deletion
// Serialized structure containing information related to creation of a file.
Example:
       Handle opened on base blob; Group ID; Content ID; Patch File
       Path.
string create_spec
// Serialized structure containing information related to restore/read
from a file.
       Example: Handle opened on the content; MJF Node ID, Path and
       expiry time.
string restore_spec
datetime end_time
int64 logical_size
int64 physical_size
// The state can be IN_PROGRESS, SUCCESS, FAILURE
BackupState backup_state
// For ensuring atomic updates to the table
uuid atomic_update_uuid
```

The keys for fetching rows include {database_identifier, backup_type, primary_tag} and {database_identifier, backup_type, file_object_name, creation_time, primary_tag}.

In some example embodiments, each log 404 is associated with a volume/service (volume_id) and has a start position denoting the oldest entry in the backup and an end position denoting the most recent entry in the backup. Further, each log file has a start and an end log position. The log chain is said to be not broken if the following condition is met: for each log file in the snapshot, the start_log_position of a log file of a TPD service is equal to one plus the end log position of the previous log of the same service/volume.

Figure 5:
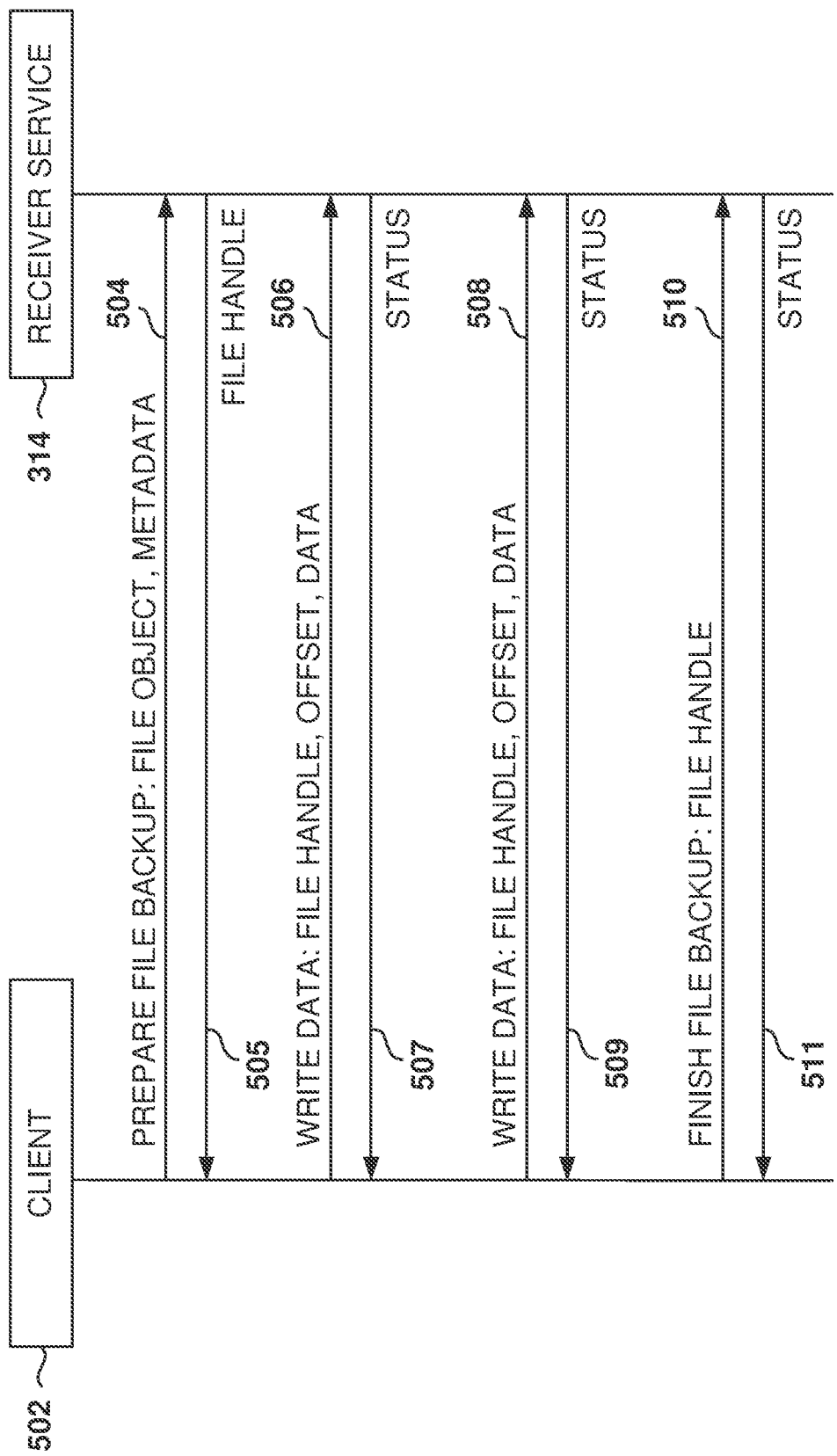
FIG. 5 illustrates the interactions between the client and a receiver service for backing up data, according to some example embodiments.

FIG. 5 illustrates the interactions between the client and a receiver service for backing up data, according to some example embodiments. The write interface is for sequential writes at a given offset.

In some example embodiments, the writing process includes several operations. The client 502 sends a prepare file backup command 504 that includes the ID of the file object and the associated metadata. The receiver service initializes the write operation and responds 505 with a file handle for writing the data. The receiver service stages the file for the write operation, and since other files that are not being used are not staged, it is possible to streamline the write process and provide a higher throughput than if all the files were active at the same time for write operations.

In some example embodiments, a combination of database identifier, backup type, and object name correspond to a file object. There can be multiple versions of a file object, and the combination of file object and creation timestamp identifies the version of the file.

Once the client has the file handle, the client 502 sends write data 506 to the receiver service 314 with the file handle, the offset in the file where to write, and the data. The receiver service 314 responds with the status 507 (e.g., write successful). The write operation may be repeated multiple times as shown in operation 508 with replay status 509.

The file handle is valid during the backup session. The file handle becomes invalid after a new backup session is started for the file object or the finish file backup request 510 is received.

To finish the write operation, the client 502 sends a finish file backup command 510 with the file handle, and the receiver service responds with the status 511. After finishing the write, the receiver service closes the file.

The separation of the stage and write operations also improves throughput because once the file is staged, the CDM is ready to receive the expected data and process the data faster.

In some example embodiments, two separate layers of metadata are implemented. The first layer includes metadata values visible by the client 502, and some of the values may be added by the client. For example, the metadata values can be the file name, tags that may be used for indexing and searching, timestamps, a backup ID, etc. Thus, the first metadata layer does not include information about where the data is stored. The second layer of metadata provides information about the storage system, such as location of the data, the node where the data is stored, etc.

Here is an example of a prepare file backup command:

```
struct PrepareFileBackupRequest {
    FileObject fileObject
    string primaryTag
    DatabaseType dbType
    int64 logicalSize
    DedupeHint dedupeHint
    string fileMetadata (optional)
    string fileTags (optional)
}
```

An example for the response is as follows:

```
struct PrepareFileBackupResponse {
    string fileHandle
    Status status
}
```

One example structure for the write operation is as follows:

```
struct WriteDataRequest {
    string fileHandle
    int64 offset
    string data
}
```

During the prepare file backup 504 operation, the CDM perform the following operations: clear up any backup in progress for the same file object; if there is a file to dedupe against, pin file contents; create a new blob for the file to be backed up; create a corresponding patch file and a patch file builder; and create an in-memory file handle.

During backup, the endpoints are exposed for the backup workflow. The backup of the file will be successful (and persisted) when the finish backup call is successful for the file.

Figure 6:
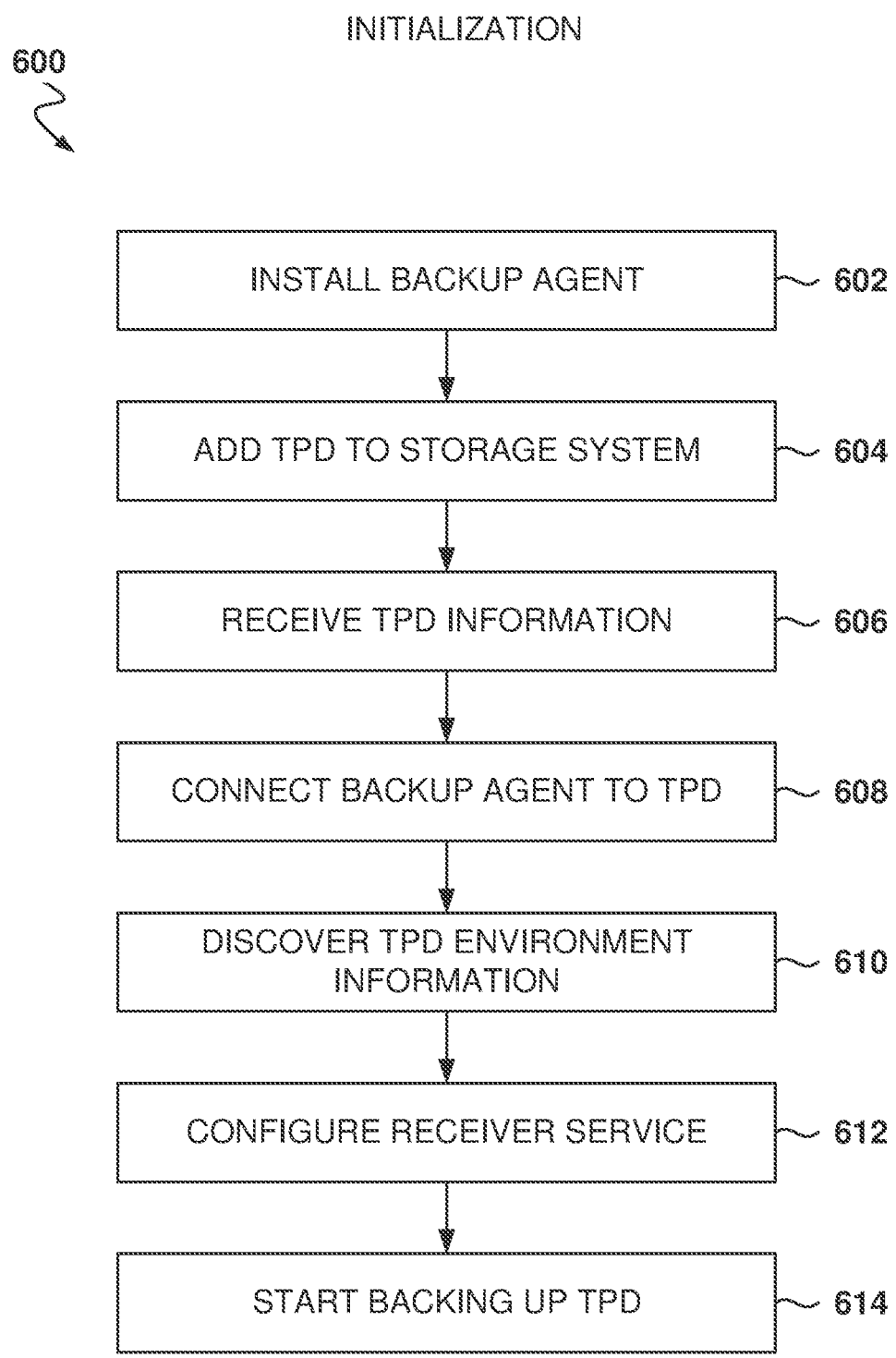
FIG. 6 is a flowchart of a method for initializing the backup service, according to some example embodiments.

FIG. 6 is a flowchart of a method 600 for initializing the backup service, according to some example embodiments. CDM collects detailed information on the TPD, which enables CDM to learn about the structure of the TPD, including the topology of the database, the organization of the data, etc. The information is used to implement a backup in CDM, and the complexity of providing backup is hidden from the user and the TPD. Although some aspects are described with reference to the SAP HANA system as the TPD, the same principles may be used for other databases.

At operation 602, the backup agent is installed in the TPD.

At operation 604, an instruction is received to add the TPD to the CDM to provide backup services.

From operation 604, the method 600 flows to operation 606 to receive the information from the user about the TPD (e.g., SAP HANA DB). In some example embodiments, for SAP HANA DB as the TPD, the user provides the following information:

SAP DB hostnames;

SID (Identification for a SAP system), SAP instance number (two digit instance number of SAP system);

List of databases: name, state (inactive/active), and type (system/tenant);

Database user credentials (username/password) having BACKUP_ADMIN & CATALOG_READ privileges; and Encrypted SQL connection (yes/no). If the SQL connection is encrypted, then the path of the keystore (optional) and crypto provider (sapcrypot|commoncrypto|openssl) are taken as input. Since queries are run connecting to the server locally, the server's certificate is not validated by the remote agent.

At operation 608, the backup agent connects to the TPD to begin the discovery process.

At operation 610, the discovery of the TPD environment is performed to collect information about the TPD. The discovery of the TPD topology and the configuration of the TPD to write to the CDM are automated and performed by the CDM.

A single TPD system can have multiple databases running in multiple hosts. For example, for SAP HANA, a single SAP HANA DB is an object, and both SAP systems and databases are SLA assignable.

In some example embodiments, the discovery includes querying the TPD. For SAP HANA, the SAP HANA DB runs on the master node and hence the master nodes are identified to fetch the required information.

In some example embodiments, the discovery is performed by submitting SQL commands to the TPD to query the TPD for information on the state of the DB. The information collected by the backup agent is then transmitted to the receiver service for configuring the backup of the TPD.

Here are some examples of SQL queries for the discovery with some sample results:

TABLE 2

| Query | SQL command |
|---|---|
| DB Info | SELECT DATABASE_NAME, ACTIVE_STATUS FROM SYS.M_DATABASES; SELECT DATABASE_NAME, 'ACTIVE' FROM SYS.M_DATABASE; Result: SYSTEMDB, ACTIVE DB_SC1, INACTIVE |
| Host Info | SELECT DISTINCT HOST, HOST_ACTIVE, NAMESERVER_ACTUAL_ROLE FROM PUBLIC.M_LANDSCAPE_HOST_ CONFIGURATION; Result: 10.0.167.120, YES, MASTER 10.0.167.121, YES, SLAVE |
| Secondary Hosts Info | SELECT DISTINCT SECONDARY_HOST, SECONDARY_ACTIVE_STATUS FROM PUBLIC.M_SERVICE_REPLICATION; Result: 10.0.167.122, OK |
| Log Mode | SELECT layer_name, key, value from SYS_DATABASES.M_INIFILE_CONTENTS where file_name='global.ini' and (key='log_mode') order by layer_name; Result: SYSTEMDB, log_mode, overwrite SC1, log_mode, normal |
| DB Backup size | SELECT * FROM "PUBLIC"."M_BACKUP_SIZE_ESTIMATIONS" |
| System Replication Info | hdbnsutil -sr_state --sapcontrol = 1 Result: SAP Hana System Replication |
| System Info | SELECT KEY, VALUE FROM "PUBLIC"."M_SYSTEM_OVERVIEW" |

After the discovery, at operation 612, the TPD interface and the receiver service are configured to perform backup operations for the TPD. For example, the list of nodes in the CDM cluster are configured in the TPD interface, so the TPD interface can send the data to one of the nodes in the list. The list of nodes can be changed based on the state of the DFS within CDM, e.g., to perform load balancing, to eliminate a node, to add a node.

At operation 614, the backup of the TPD is started.

Figure 7:
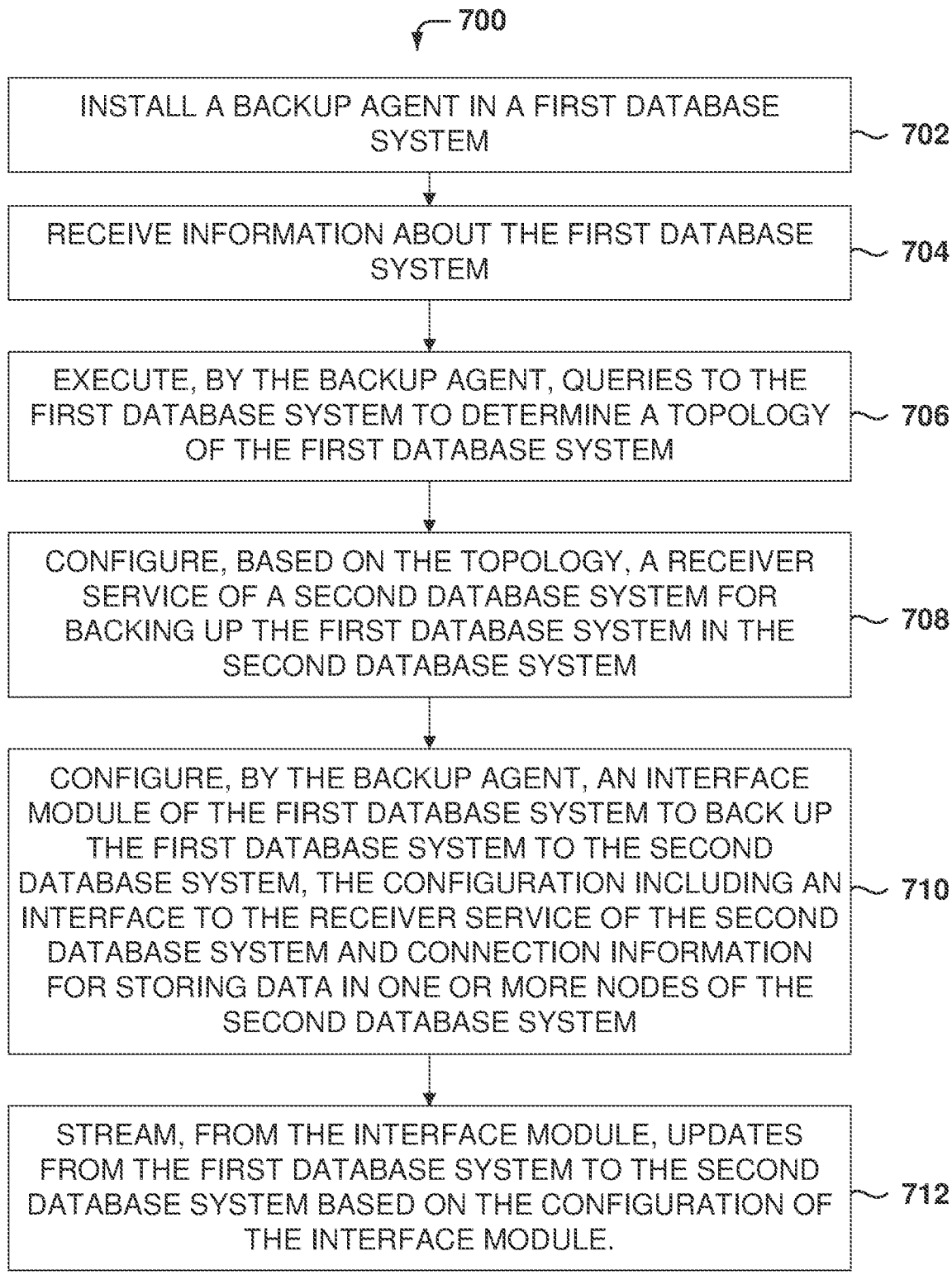
FIG. 7 is a flowchart of a method for providing backup services to a database, according to some example embodiments, for performing damage simulations.

FIG. 7 is a flowchart of a method 700 for providing backup services to a database, according to some example embodiments, for performing damage simulations. While the various operations in this flowchart are presented and described sequentially, one of ordinary skill will appreciate that some or all of the operations may be executed in a different order, be combined or omitted, or be executed in parallel.

Operation 702 is for installing a backup agent in a first database system.

From operation 702, the method 700 flows to operation 704 to receive information about the first database system.

From operation 704, the method 700 flows operation 706 for executing, by the backup agent, queries to the first database system to determine a topology of the first database system.

From operation 706, the method flows to operation 708 to configure, based on the topology, a receiver service of a second database system for backing up the first database system in the second database system.

At operation 710, the backup agent configures an interface module of the first database system to back up the first database system to the second database system. The configuration includes an interface to the receiver service of the second database system and connection information for storing data in one or more nodes of the second database system.

From operation 710, the method 700 flows to operation 712 for streaming, from the interface module, updates from the first database system to the second database system based on the configuration of the interface module.

In one example, the second database system provides full backups for a given timestamp and incremental backups based on the full backups.

In one example, the connection information includes a list of internet protocol (IP) address of the nodes of the second database system, where the list of IP addresses is updated over time by the backup agent based on a state of the second database system.

In one example, streaming updates from the first database system comprises selecting randomly one from the list of IP addresses for storing the updates.

In one example, updates from the first database system comprise transaction logs.

In one example, streaming updates from the first database system comprises sending a prepare file backup command to the receiver service that returns a file handle, writing data to the receiver service utilizing the file handle, and sending a finish file backup to the receiver service.

In one example, the prepare file backup command includes an identifier of a file object and metadata associated with the file object.

In one example, writing data to the receiver service includes the file handle, an offset within the file object, and the data written to the file object.

In one example, the information about the first database system comprises hostnames of the first database system, identifier of the first database system, and user credentials for accessing the first database system.

In one example, the queries to the first database system include SQL queries comprising: query for active status of one or more databases; query for IP addresses of the hosts; query for determining a log mode; and query for size of a backup.

Another general aspect is for a system that includes a memory comprising instructions and one or more computer processors. The instructions, when executed by the one or more computer processors, cause the one or more computer processors to perform operations comprising: installing a backup agent in a first database system; receiving information about the first database system; executing, by the backup agent, queries to the first database system to determine a topology of the first database system; configuring, based on the topology, a receiver service of a second database system for backing up the first database system in the second database system; configuring, by the backup agent, an interface module of the first database system to back up the first database system to the second database system, the configuration including an interface to the receiver service of the second database system and connection information for storing data in one or more nodes of the second database system; and streaming, from the interface module, updates from the first database system to the second database system based on the configuration of the interface module.

In yet another general aspect, a machine-readable storage medium (e.g., a non-transitory storage medium) includes instructions that, when executed by a machine, cause the machine to perform operations comprising: installing a backup agent in a first database system; receiving information about the first database system; executing, by the backup agent, queries to the first database system to determine a topology of the first database system; configuring, based on the topology, a receiver service of a second database system for backing up the first database system in the second database system; configuring, by the backup agent, an interface module of the first database system to back up the first database system to the second database system, the configuration including an interface to the receiver service of the second database system and connection information for storing data in one or more nodes of the second database system; and streaming, from the interface module, updates from the first database system to the second database system based on the configuration of the interface module.

Figure 8:
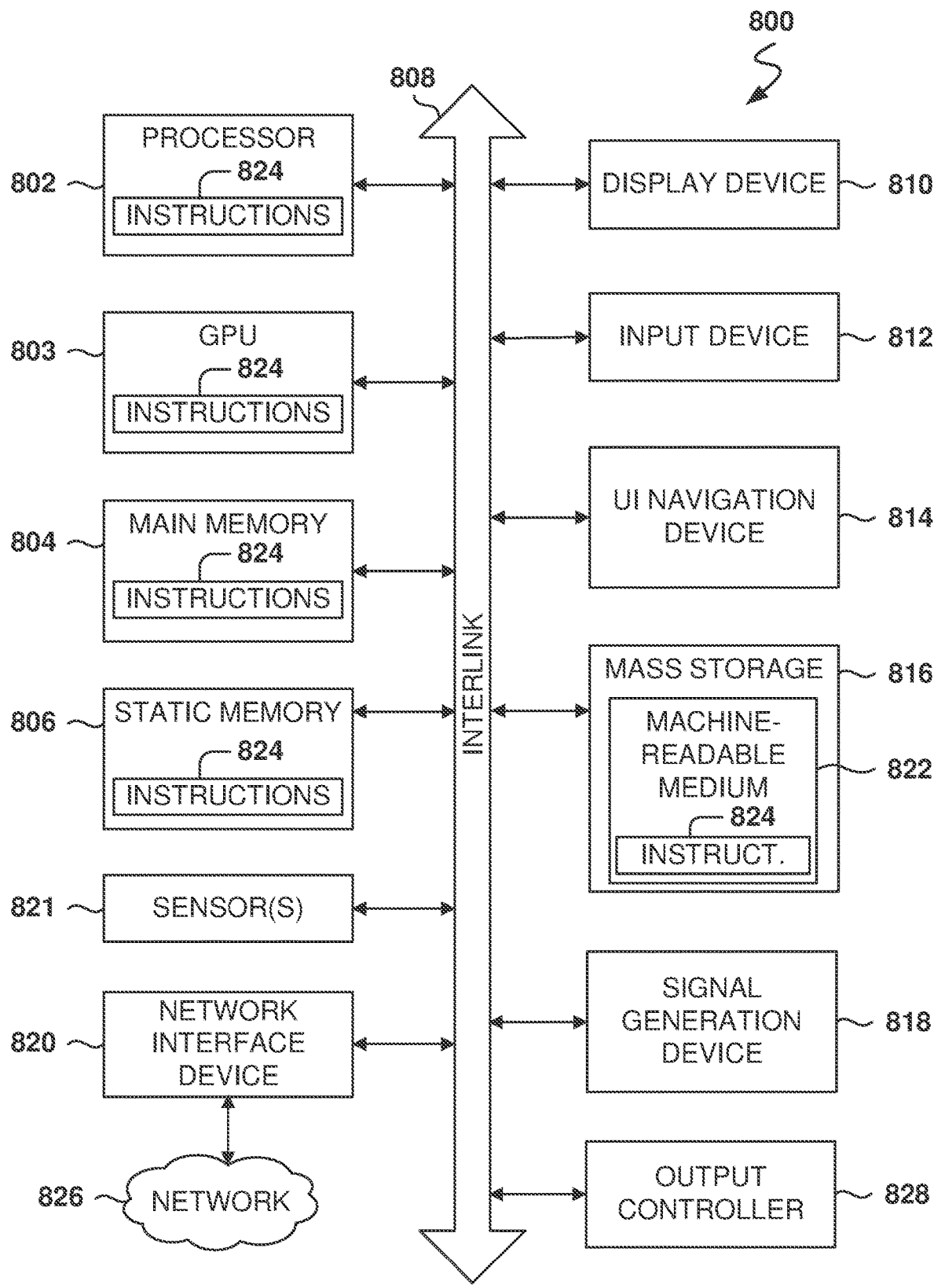
FIG. 8 is a block diagram illustrating an example of a machine upon or by which one or more example process embodiments described herein may be implemented or controlled.

FIG. 8 is a block diagram illustrating an example of a machine 800 upon or by which one or more example process embodiments described herein may be implemented or controlled. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in a peer-to-peer (P2P) (or other distributed) network environment. Further, while only a single machine 800 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 800 may include a hardware processor 802 (e.g., a central processing unit (CPU), a hardware processor core, or any combination thereof), a graphics processing unit (GPU) 803, a main memory 804, and a static memory 806, some or all of which may communicate with each other via an interlink (e.g., bus) 808. The machine 800 may further include a display device 810, an alphanumeric input device 812 (e.g., a keyboard), and a user interface (UI) navigation device 814 (e.g., a mouse). In an example, the display device 810, alphanumeric input device 812, and UI navigation device 814 may be a touch screen display. The machine 800 may additionally include a mass storage device (e.g., drive unit) 816, a signal generation device 818 (e.g., a speaker), a network interface device 820, and one or more sensors 821, such as a Global Positioning System (GPS) sensor, compass, accelerometer, or another sensor. The machine 800 may include an output controller 828, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, within the hardware processor 802, or within the GPU 803 during execution thereof by the machine 800. In an example, one or any combination of the hardware processor 802, the GPU 803, the main memory 804, the static memory 806, or the mass storage device 816 may constitute machine-readable media.

While the machine-readable medium 822 is illustrated as a single medium, the term "machine-readable medium" may include a single medium, or multiple media, (e.g., a centralized or distributed database, and/or associated caches and servers) configured to store the one or more instructions 824.

The term "machine-readable medium" may include any medium that is capable of storing, encoding, or carrying instructions 824 for execution by the machine 800 and that cause the machine 800 to perform any one or more of the techniques of the present disclosure, or that is capable of storing, encoding, or carrying data structures used by or associated with such instructions 824. Non-limiting machine-readable medium examples may include solid-state memories, and optical and magnetic media. In an example, a massed machine-readable medium comprises a machine-readable medium 822 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device 820.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
   transmitting, from a second computing system to a backup agent installed at a first computing system, file information associated with a target file included in a distributed file system at the second computing system, the target file for writing backup data associated with the first computing system;
   receiving, at the second computing system from the backup agent, a request to write the backup data to the target file included in the distributed file system, wherein the request indicates the target file based at least in part on the file information previously transmitted to the backup agent;
   writing, by the second computing system in response to the request, the backup data to the target file included in the distributed file system;
   receiving, at the second computing system from the backup agent, an indication to close the target file; and
   closing, by the second computing system, the target file in response to the indication to close the target file.

2. The method of claim 1, further comprising:
   transmitting, to the first computing system, one or more instructions that are executable to install the backup agent of the second computing system on at least one host of the first computing system.

3. The method of claim 2, wherein the backup agent is operable to use a backup interface to communicate with the second computing system and a database of the first computing system.

4. The method of claim 1, further comprising:
   transmitting, to the backup agent running on the first computing system, information associated with two or more nodes of the distributed file system within the second computing system, wherein the request to write the backup data to the target file is addressed based at least in part on the information associated with the two or more nodes.

5. The method of claim 1, wherein writing the backup data to the target file comprises:
   storing, in the distributed file system, a set of patch files and a set of transaction logs associated with a set of data files from a database of the first computing system, the backup data comprising the set of patch files and the set of transaction logs.

6. The method of claim 1, further comprising:
   transmitting, to the backup agent running on the first computing system, one or more commands for synchronizing, across the first computing system and the second computing system, information associated with the backup data.

7. The method of claim 1, wherein writing the backup data to the target file comprises:
   transferring one or more transaction logs or data files from the first computing system to the second computing system via the backup agent.

8. The method of claim 1, further comprising:
   staging, by a receiver service of the second computing system, the target file prior to writing the backup data to the target file.

9. The method of claim 1, further comprising:
   receiving, by a receiver service of the second computing system, the backup data, a file handle associated with the target file, and an offset indicating a location for writing the backup data within the target file.

10. The method of claim 1, wherein writing the backup data to the target file comprises repeating a write operation multiple times.

11. The method of claim 1, wherein receiving the indication to close the target file comprises:
    receiving, by a receiver service of the second computing system, a finish file backup command indicating a file handle associated with the target file, wherein closing the target file is based at least in part on the finish file backup command.

12. The method of claim 1, wherein the backup data comprises a first metadata layer that is visible to a client of a receiver service of the second computing system and a second metadata layer that is not visible to the client of the receiver service.

13. The method of claim 12, wherein the first metadata layer comprises a file name of the target file, tags used for indexing and searching, timestamps, or a backup identifier, or any combination thereof, and wherein the second metadata layer comprises information about a location of the target file within the second computing system.

14. The method of claim 1, further comprising:

performing a prepare file backup operation that includes clearing backups in progress for the target file, pinning contents of the target file, creating a blob for the target file, creating a corresponding patch file and patch file builder, or creating an in-memory file handle for the target file, or any combination thereof, wherein writing the backup data to the target file is based at least in part on the prepare file backup operation.

15. A method, comprising:

receiving, by a backup agent installed at a first computing system and from a second computing system, file information associated with a target file included in a distributed file system of the second computing system, the target file for writing backup data associated with the first computing system;

transmitting, from the backup agent to the second computing system, a request to write the backup data to the target file included in the distributed file system of the second computing system, wherein the request indicates the target file based at least in part on the file information previously received by the backup agent;

transmitting, from the backup agent to the second computing system, an indication to close the target file; and receiving, by the backup agent and from the second computing system, one or more commands associated with synchronizing the backup data across the first computing system and the second computing system.

16. The method of claim 15, further comprising:

transferring one or more transaction logs or data files from the first computing system to the second computing system via the backup agent.

17. The method of claim 15, further comprising:

transmitting, to a receiver service of the second computing system, the backup data, a file handle associated with the target file, and an offset indicating a location for writing the backup data within the target file.

18. The method of claim 15, wherein transmitting the indication to close the target file comprises:

transmitting, to a receiver service of the second computing system, a finish file backup command indicating a file handle associated with the target file, wherein closing the target file is based at least in part on the finish file backup command.

19. An apparatus, comprising:

one or more memories storing code; and one or more processors coupled with the one or more memories and individually or collectively operable to execute the code to cause the apparatus to:

transmit, from a second computing system to a backup agent installed at a first computing system, file information associated with a target file included in a distributed file system at the second computing system, the target file for writing backup data associated with the first computing system;

receive, at the second computing system from the backup agent, a request to write the backup data to the target file included in the distributed file system, wherein the request indicates the target file based at least in part on the file information previously transmitted to the backup agent;

write, by the second computing system in response to the request, the backup data to the target file included in the distributed file system;

receive, at the second computing system from the backup agent, an indication to close the target file; and close, by the second computing system, the target file in response to the indication to close the target file.

20. An apparatus, comprising:

one or more memories storing code; and one or more processors coupled with the one or more memories and individually or collectively operable to execute the code to cause the apparatus to:

receive, by a backup agent installed at a first computing system and from a second computing system, file information associated with a target file included in a distributed file system of the second computing system, the target file for writing backup data associated with the first computing system;

transmit, from the backup agent to the second computing system, a request to write the backup data to the target file included in the distributed file system of the second computing system, wherein the request indicates the target file based at least in part on the file information previously received by the backup agent;

transmit, from the backup agent to the second computing system, an indication to close the target file; and receive, by the backup agent and from the second computing system, one or more commands associated with synchronizing the backup data across the first computing system and the second computing system.

* * * * *